United States Patent
Pedersen et al.

(10) Patent No.: US 8,393,626 B2
(45) Date of Patent: Mar. 12, 2013

(54) CONTINUOUSLY CURED EPDM USED IN VARIOUS DAMPENING APPLICATIONS INCLUDING VEHICLE AXLE CORDS

(75) Inventors: Frederick E. Pedersen, Brecksville, OH (US); Eldon S. Eady, Chardon, OH (US)

(73) Assignee: Production Systems, Inc., Akron, OH (US)

( * ) Notice: Subject to any disclaimer, the term of this patent is extended or adjusted under 35 U.S.C. 154(b) by 509 days.

(21) Appl. No.: 12/578,458

(22) Filed: Oct. 13, 2009

(65) Prior Publication Data

US 2010/0093921 A1 Apr. 15, 2010

Related U.S. Application Data

(60) Provisional application No. 61/196,029, filed on Oct. 14, 2008.

(51) Int. Cl.
*B60G 17/00* (2006.01)
*B60G 17/02* (2006.01)
*B60G 17/06* (2006.01)
*B60G 9/02* (2006.01)

(52) U.S. Cl. .... 280/124.1; 524/571; 525/55; 525/331.7; 264/299; 280/124.177; 280/124.17; 280/124.169

(58) Field of Classification Search ............ 524/571; 526/335; 264/299; 280/124.177, 124.17, 280/124.169, 124.1; 525/50, 326.1, 331.7, 525/55

See application file for complete search history.

(56) References Cited

U.S. PATENT DOCUMENTS

| | | | |
|---|---|---|---|
| 2001/0009930 A1 * | 7/2001 | Lunt et al. | 521/134 |
| 2003/0149147 A1 * | 8/2003 | Graf et al. | 524/232 |
| 2006/0131797 A1 * | 6/2006 | Kerstetter, III | 267/64.11 |
| 2007/0244263 A1 * | 10/2007 | Burrowes | 525/326.1 |

* cited by examiner

*Primary Examiner* — James J. Seidleck
*Assistant Examiner* — Deve E Valdez
(74) *Attorney, Agent, or Firm* — James C. Scott; Roetzel & Andress

(57) ABSTRACT

The present invention generally relates to the use of EPDM (ethylene-propylene diene monomer) polymer compounds used in place of NR (natural rubber), SBR (styrene butadiene rubber), polyisoprene and other polymers in energy absorption elastomeric systems. In one embodiment a method of continuously manufacturing an EPDM based compound cured via a peroxide based cure system and used in an energy absorption elastomeric system is disclosed. The method includes the steps of forming a continuous part from a compound based on ethylene-propylene diene terpolymer and then curing the part via a continuous process and optionally cutting the final part to the appropriate length. Various advantages are achieved via the use of peroxide cured EPDM as replacements for NR, SBR, polyisoprene and other polymers.

10 Claims, 2 Drawing Sheets

CONTINUOUSLY CURED EPDM USED IN VARIOUS DAMPENING APPLICATIONS INCLUDING VEHICLE AXLE CORDS

RELATED APPLICATION DATA

This application claims priority to previously filed U.S. Provisional Patent Application No. 61/196,029, filed on Oct. 14, 2008, entitled "Continuously Cured EPDM Used in Various Dampening Applications Including Vehicle Axle Cords", which is incorporated by reference herein in its entirety.

FIELD OF THE INVENTION

The present invention generally relates to the use of EPDM (ethylene-propylene diene monomer) polymer compounds used in place of NR (natural rubber), SBR (styrene butadiene rubber), polyisoprene and other polymers in energy absorption elastomeric systems. In one embodiment a method of continuously manufacturing an EPDM based compound cured via a peroxide based cure system and used in an energy absorption elastomeric system is disclosed. The method includes the steps of forming a continuous part from a compound based on ethylene-propylene diene terpolymer and then curing the part via a continuous process and optionally cutting the final part to the appropriate length. Various advantages are achieved via the use of peroxide cured EPDM as replacements for NR, SBR, polyisoprene and other polymers.

BACKGROUND OF THE INVENTION

Various polymer configurations are integral parts of energy absorption systems. EPDM (ethylene-propylene diene monomer) are not utilized in energy absorption systems. Typically NR (natural rubber), SBR (styrene butadiene rubber), polyisoprene and/or any combination of the various other polymers are used as the base polymers in a rubber compound formulation for energy absorptions systems. This rubber compound has specific properties needed in an energy absorption application. Typical properties measured include, but are not limited to, hardness, modulus, elongation, elasticity, rebound, compression set, tensile strength and other rheometric properties. The use of NR, SBR, polyisoprene and/or combination of various other polymers has drawbacks though as these polymers have a tendency to breakdown in certain applications. It is for these reasons that the use of an EPDM in some applications, is desired.

In the field of vehicle dynamics, one attempts to minimize the amount of travel an axle undergoes. One such suspension system includes the use of a semi-hollow steel torsion bar in which an axle is located inside a steel torsion bar. Located in close proximity to or alongside the steel torsion bar are various rubber parts which dampen the movement of the axle inside the semi-hollow steel torsion bar. Such a setup can be employed to displace a leaf spring. The rubber parts used to dampen the movement can be a variety of shapes, all of which may be molded to the shape desired (i.e., compression molded, transfer molded, injection molded, etc.). It would be advantageous to develop a continuously cured compound which could be cut to length after extrusion and curing and utilizes EPDM in place of other polymers (this would occur in place of this compression molded rubber part). It would also be advantageous to develop a peroxide cured EPDM in place of other polymer to provide the degradation resistance and overall properties available in such a system.

SUMMARY OF THE INVENTION

The present invention generally relates to the use of EPDM (ethylene-propylene diene monomer) polymer compounds used in place of NR (natural rubber), SBR (styrene butadiene rubber), polyisoprene and other polymers in energy absorption elastomeric systems. In one embodiment a method of continuously manufacturing an EPDM based compound cured via a peroxide based cure system and used in an energy absorption elastomeric system is disclosed. The method includes the steps of forming a continuous part from a compound based on ethylene-propylene diene terpolymer and then curing the part via a continuous process and optionally cutting the final part to the appropriate length. Various advantages are achieved via the use of EPDM as replacements for NR, SBR, polyisoprene and other polymers.

The present invention discloses a method of continuously curing EPDM as described and disclosed herein. In another embodiment, the present invention discloses a continuously cured EPDM material as described and disclosed herein. In still yet another embodiment the present invention discloses the use of a peroxide cured EPDM compound in a high resilience applications involving shock, energy absorption and/or dissipation in spring, and/or suspension parts for trailers, automobiles, trucks or other vehicles as described and disclosed herein. In another embodiment the present invention discloses the use of a continuously cured peroxide cured EPDM extrusion in place of a molded part. In yet another embodiment the present invention discloses a method of using a continuously cured EPDM in place of a continuously cured SBR, NR or polyisoprene. In still another embodiment the present invention discloses the use of a continuously cured peroxide cured EPDM in shock absorption applications, energy absorbing applications such as springs, shock mounts, rubber suspension parts where traditionally NR, SBR or polyisoprene compounds have been used.

In one embodiment the present invention discloses a rubber compound suspension component comprising at least one peroxide cured EPDM compound, wherein the at least one peroxide cured EPDM compound has a compression set in the range of about 0.01% to about 20%.

In another embodiment the present invention discloses a suspension component comprising at least one peroxide cured EPDM compound, wherein the at least one peroxide cured EPDM compound has a tensile strength of at least about 2000 psi, a 100% modulus of at least about 750 psi, an elongation of at least about 200%, and a compression set in the range of about 8% to about 12%.

In still yet another embodiment the present invention discloses a method for forming at least one suspension part from a peroxide cured EPDM the method comprising the steps of: providing at least one peroxide cured EPDM compound having a compression set in the range of about 0.01% to about 20%, and forming at least one suspension part from the at least one EPDM compound, wherein the suspension part is designed use on a automobile, truck or trailer.

DETAILED DESCRIPTION OF THE INVENTION

Figure 1:
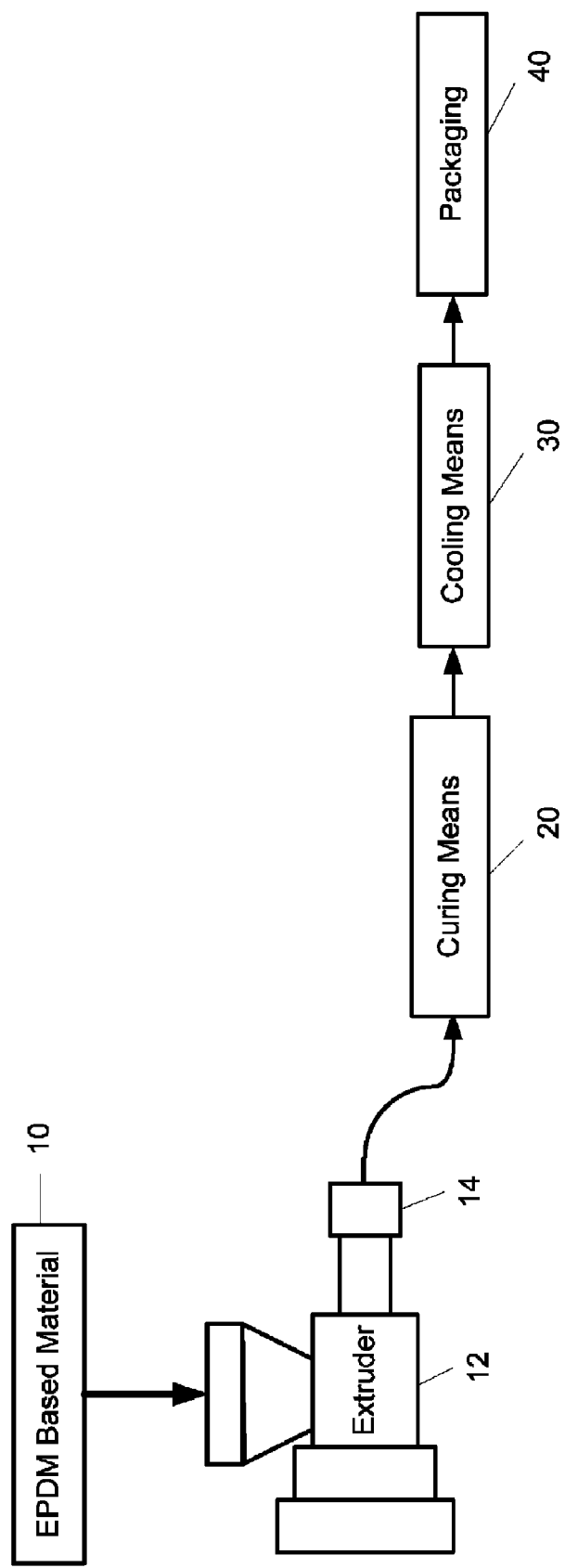
FIG. 1 is a flowchart detailing the various processing steps involved in the manufacture of the EPDM product.

The present invention generally relates to the use of EPDM (ethylene-propylene diene monomer) polymer compounds used in place of NR (natural rubber), SBR (styrene butadiene rubber), polyisoprene and other polymers in energy absorption elastomeric systems. In one embodiment a method of continuously manufacturing an EPDM based compound cured via a peroxide based cure system and used in an energy absorption elastomeric system is disclosed. The method includes the steps of forming a continuous part from a compound based on ethylene-propylene diene terpolymer and then curing the part via a continuous process and optionally cutting the final part to the appropriate length. Various advantages are achieved via the use of peroxide cured EPDM as replacements for NR, SBR, polyisoprene and other polymers.

In these embodiment EPDM degrades less due to its ability to resist oxidation/ozo-nation while maintaining resilience and/or a low compression set. It is widely known in the art that EPDM, and specifically peroxide cured EPMD, outperforms NR for degradation resistance. It is also widely known that EPDM typically does not perform well in energy absorption elastomeric systems as it lacks the required resiliency. The use of a peroxide cured EPDM cures this problem. Specifically, the use of a peroxide cured EPDM increases rebound performance versus a standard EPDM cure. This curing strategy is coupled with the low compression set a peroxide cured EPDM compound typically provides. In some embodiments, the unique combination of EPDM and the properties afforded by a peroxide cured EPDM provide characteristics not seen in previous vehicle dynamic applications.

EPDM elastomers are terpolymers of ethylene/propylene and a suitable diene monomer. Examples of suitable diene monomers include, but are not limited to, 1,4 hexadiene, dicylopentadiene and ethylidene norbornene (ENB). One of the more widely used dienes for commercial grade EPDM elastomers is ENB which produces poly(ethylene-co-polypropylene-co-ENB). One example of an EPDM polymer comprises 50 parts by weight ethylene, 45 parts of polypropylene and 5 parts ENB. The use of the diene monomer produces a resulting terpolymer that can be crosslinked or cured. The same sulfur curing agents and accelerators used to cure natural rubber are commonly used to cure EPDM. In some instances, peroxide curing agents have also been employed. EPDM elastomers are strong, durable materials and serve well in a variety of automotive applications including those involving high heat and applications where the resultant rubber compound contacts water.

One objective of the present invention is to provide an EPDM compound that can be extruded, continuously cured and formed to produce a shock absorber and/or a suspension part(s) for trailers, automobiles, trucks, etc.

It is another object of the present invention to produce a compound which replaces styrene butadiene rubber (SBR) such as SBR 1502 or SBR 1507, other 100% rubber hydrocarbon SBR, polyisoprenes such as Natsyn 2200 (Goodyear), IR 2200 (Nippon Zeon) or Ski-3 (groups I and II) and Natural Rubber (NR) such as SIR 20 or CV60. All of the previously listed being traditional elastomers used in the application, whether extruded or molded. Replacement of these standard polymers with the EPDM compound of the present invention results in a compound with improved properties including a lower compression set and resistance to degradation. In addition, the use of a peroxide cure, significantly improves the compounds rebound performance.

In accordance with one embodiment of the invention these and other suitable objects are manufactured as follows. The initial steps provide an uncured EPDM polymer to which nearly any commercially available EPDM polymers are suitable. The EPDM polymer is mixed with suitable quantities of commonly used materials known in the art. These material include, but are not limited to, carbon black, talc, precipitated silica, fumed silica, process aids, activators and the like. However, in accordance with our invention, a specific curing agent or curing agent-coagent combination is employed with the suitable cure system used to cure the elastomer. In one embodiment, the curing agent is a peroxide and the optional coagent is one of a variety of coagents, including but not limited to a trimethylolpropane trimethacrylate ester (such as SR-350) and a phenylenedimaleimide (such as HVA-2). Both of these materials and the peroxide curing agents are readily available in the marketplace. One embodiment requires that either a peroxide or a combination of peroxide and coagent be used to achieve the dynamic properties, which are typically not achievable using a sulfur based cure system. The curing agent and coagent are mixed thoroughly with the other constituents of the polymer formulation.

In one embodiment a representative compound would utilize the following material ingredients:

| Material | % by weight |
| --- | --- |
| Medium ethylene, medium to low viscosity EPDM | 40-55 |
| Reinforcing filler | 35-50 |
| Process aid | 1-7 |
| Cure system | 2-10 |
| Coupling agent | 0-3 |

Such a compound can achieve the desired low compression set resistance and range needed for compression deflection. This type of compound in some cases can be more economical than traditionally used materials such as NR, SBR or polyisoprene, based on fluctuations in polymer pricing. In addition this material can be continuously extruded and cured which can be more cost efficient than extruding a preform, molding and curing the compound, again this analysis being based on fluctuations in polymer pricing.

In the present invention the compound is mixed, extruded and continuously cured using media such as a salt bath, microwaves, radiation, hot air, and/or glass beads to achieve the desired properties. As shown in FIG. 1 the compound is mixed using standard rubber mixing procedures which include Banbury mixing. From there, EPDM material 10 is placed into extruder 12. Extruder 12 is typically a single screw extruder, but a variety of polymer based extruders, as known in the art, can be utilized. The temperature in the extruder zones are typically set from about 80° F. through about 220° F., with head 14 heated to about 220° F. through about 400° F. These temperatures can vary due to varying extrusion strategies known in the art. For example, one can utilize an elevated mix zone temperature and a cold die head or in the alternative can utilize a cool mix zone temperature and an elevated temperature die head.

Once the material leaves the die head it enters curing means 20. Curing means 20 involves a curing medium commonly heated to temperatures from about 300° F. through about 500° F. This temperature varies depending on the length of the curing means, media bath, or oven, and the speed at which the extruded material travels through curing means 20. This temperature being the typical cure range for rubber based polymers. Curing means 20 is selected from, but not limited to: salt bath, microwave, radiation, hot air, glass beads, liquid, and infrared.

After the requisite amount of time spent in curing means 20 at the required temperature the material enters cooling means 30. Cooling means 30 is selected from, but not limited to: cool air, refrigeration, water and/or other liquids. Once the material has reached the desired temperature the material is packaged 40 via any number of packaging methods. Optionally, the cured product can be cut to length. This cutting is typically done after the cooling means 30 stage, but based upon the desired final product and the parameters of the mixing, the cutting may occur after leaving die head 14, after curing means 20 or after entering packaging stage 40. In one embodiment, the resultant continuous cord(s) are cut by various means to the various lengths needed in forming the cords used in the axle of a vehicle or trailer.

The continuously cured EPDM material can be utilized in a variety of products and/or applications. Examples of such products/applications include, but are not limited to: axle cords, shock absorbent systems, shock absorbers, axle dampeners, and leaf springs. As one of ordinary skill in the art would realize, various other uses for the compounds of the present invention exist, but are not discussed for the sake of brevity. The compound and the curing means produces a highly dynamic product, one which has low compression set, a term known in the rubber compounding art. In most instances the compression set is from about 0.01% to about 20% or from about 3% to 15%, or even from about 8% to about 12%. The compression set value being critical to avoid slippage and/or excessive movement of the various components. Such movement diminishing the ultimate effectiveness of the dampening mechanism.

Figure 2A:
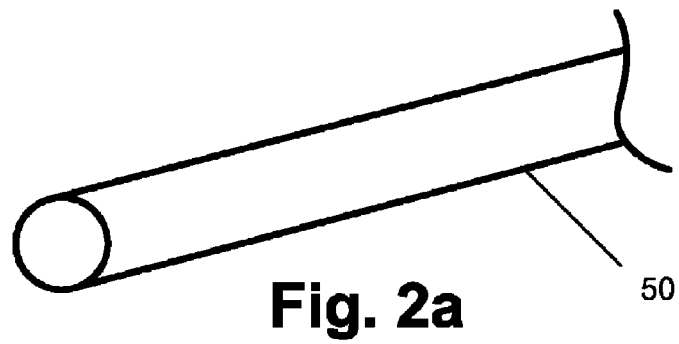
FIG. 2(a) is a representative drawing of the extruded product.
Figure 2B:
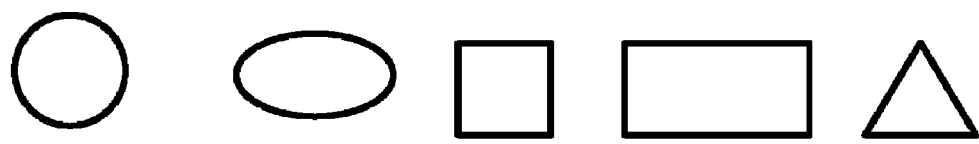
FIG. 2(b) are various cross sectional drawings of suitable cords.
Figure 3:
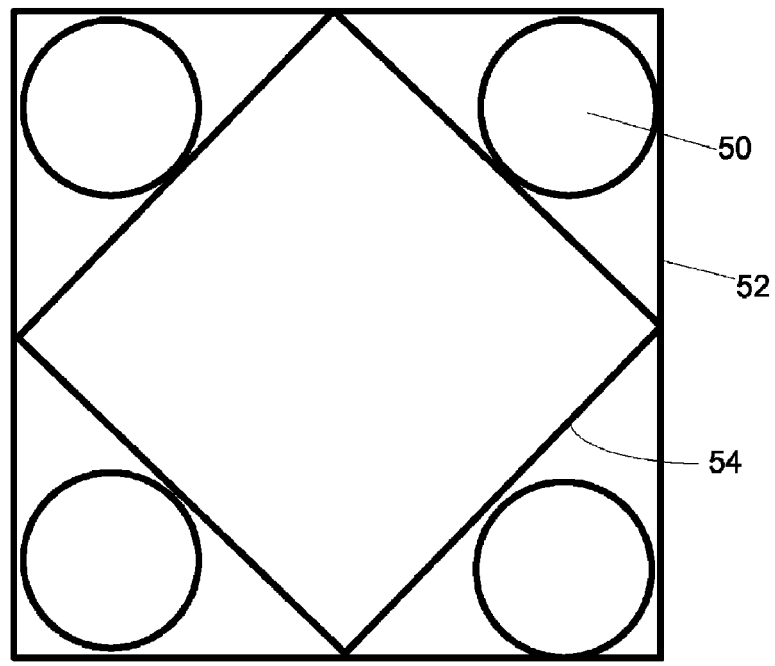
FIG. 3 is a cross sectional drawing detailing one use of the product in a vehicle axle.

In one embodiment, a product in conjunction with the present invention can be as a continuously extruded rod-like product 50 also known as a rubber cord, as seen in FIG. 2a. The cross section of this product can be a variety of shapes, a sampling of which are shown in FIG. 2b. FIGS. 2a and 2b are meant for illustrative purposes and should not be viewed as limiting, as any number of cross sectional shapes are possible. FIG. 3 details one embodiment of rubber cord 50 and how it is incorporated into a dampening means. In one embodiment rod/rubber cord 50 is placed into semi-hollow steel torsion bar 52. Main axle 54 running the length of semi-hollow steel torsion bar 52. The rubber cord 50 being either continuous or intermittent throughout the length of semi-hollow steel torsion bar 52. While the shape of axle 54 in FIG. 3 is a square, any number of shapes or configurations are possible, so long as they provide adequate means for interaction with the dynamic aspects of rubber cord 50.

In another embodiment the semi-hollow steel torsion bar 52 and main axle 54 are part of a torsion axle system in which the axle is offset from the wheel spindle. In this embodiment, the rubber cords or rod-like product 50 are pressed into a triangular shape, frozen using nitrogen and then inserted into the semi-hollow steel torsion bar 52, next to wheel axle 54. Once the rubber cord(s) 50 is/are allowed to thaw they form an interference fit with wheel axle 54.

EXAMPLES

The following examples are for illustrative purpose only and are non-limiting in nature. In one embodiment the formulation for a suitable EPDM cord compound is:

| Ingredient | Parts Per Hundred Rubber (PHR) |
|---|---|
| Vistalon 2504 | 100 |
| SRF carbon black | 75 |
| Process Aid | 3 |
| DiCup 40ke | 7 |

Vistalon 2504 is an uncured EPDM material obtained from Exxon Chemical Company. It is representative of the type of curable terpolymers that may be utilized in this invention. The resultant compound above utilizes a peroxide cure, while other peroxides and coagents such as HVA-2 may be used depending on the application involved. Vistalon 2504 contains approximately 50% ethylene, 45% propylene and has a medium level of ENB. The level of carbon black is adjustable and will vary with specific requirements in the various applications, as is the addition of other fillers and process aids. DiCup 40ke is dicumyl peroxide carried on Burgess KE clay. The 40 refers to the percent peroxide activity, 39.5 to 40.5 percent by weight of the material.

The curing characteristics and cured properties of the above formulation are as follows:

| | |
|---|---|
| Tensile Strength | 2000 psi |
| 100% modulus, | 750 psi |
| Elongation | 200% |
| Hardness | 75 pts |
| Compression Set Resistance (Under 50% Compression - 70C) ASTM D2000 | >5% |

Other peroxides which will produce acceptable results at the same mole peroxide strength using a variety of carriers, include Vul-cup® a bis(t-butylperoxy) diisopropyl benzene, or DBPH-50. Changes, as known to one of skill in the art, to the base compound and the curing of same will result in compounds with other properties. In another embodiment, the peroxide cured EPMD has a tensile strength of at least about 1000 psi, or at least about 1200 psi. In yet another embodiment, the peroxide cured EPMD has a 100% modulus of at least about 500 psi, or at least about 625 psi. In still yet another embodiment, the peroxide cured EPMD has an elongation of at least about 100%. Again, these properties are only illustrative and are not to be construed as limiting.

The dicumyl peroxide curing system is described in connection with a specific uncured EPDM terpolymer mixture. In one embodiment, it is to be understood that the curing system is useful with peroxide curable EPDM terpolymers. The selection of the specific terpolymer is mixture of terpolymers may be made on the basis of the desired cure rate, viscosity, cost or the like. Similarly it should be understood that the selection of particular fillers, process aids, antioxidants, and other additives and coagents is at the discretion of the user and in normal practice not critical of the use of the present invention.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A peroxide cured EPDM rubber compound suspension component comprising:
   one EPDM polymer at 100 parts per hundred rubber of the EPDM rubber compound and no other EPDM polymer;
   wherein the one peroxide cured EPDM rubber compound has a compression set in the range of about 5% to about 10.5%;

the one peroxide cured EPDM rubber compound has a tensile strength of at least about 1000 psi, a 100% modulus of at least about 500 psi, and an elongation of at least about 100%;

wherein the suspension component is an axle cord, a shock absorbent system, a shock absorber and axle dampener, or a leaf spring.

2. The suspension component of claim 1, wherein the suspension component is designed for use on the suspension of an automobile, truck or trailer.

3. The suspension component of claim 1, wherein the suspension component is designed for use on the drive system of an automobile, truck or trailer.

4. The suspension component of claim 1, wherein the one peroxide cured EPDM rubber compound has a compression set in the range of about 8% to about 10.5%.

5. The suspension component of claim 1, wherein the one peroxide cured EPDM rubber compound has a tensile strength of at least about 1200 psi, a 100% modulus of at least about 625 psi, and an elongation of at least about 100%.

6. The suspension component of claim 1, wherein the one peroxide cured EPDM rubber compound comprises:

about 40 to about 55 weight percent of a mixture of medium and low viscosity EPDM;

about 35 to about 50 weight percent of at least one reinforcing filler;

about 1 to about 7 weight percent of one or more processing aids; and about 2 to about 10 weight percent of one or more curing aids; and about 0 to about 3 weight percent of one or more coupling agents.

7. The suspension component of claim 1, wherein the one peroxide cured EPDM rubber compound is cured using a salt bath, microwaves, radiation, hot air, or glass beads.

8. The suspension component of claim 1, wherein the one peroxide cured EPDM rubber compound is cured at a temperature in the range of about 300° F. to about 500° F.

9. The suspension component of claim 1, wherein the one peroxide cured EPDM rubber compound is extruded with a die head temperature in the range of about 220° F. to about 400° F.

10. A suspension component comprising:

one peroxide cured EPDM rubber compound wherein one EPDM polymer is used at 100 parts per hundred rubber of the EPDM rubber compound and no other EPDM rubber is used;

wherein the one peroxide cured EPDM rubber compound has a tensile strength of at least about 2000 psi, a 100% modulus of at least about 750 psi, an elongation of at least about 200%, and a compression set in the range of about 8% to about 10.5%; and wherein the suspension component is an axle cord, a shock absorbent system, a shock absorber and axle dampener, or a leaf spring.

* * * * *